(12) United States Patent
Chang

(10) Patent No.: US 8,693,190 B2
(45) Date of Patent: Apr. 8, 2014

(54) CASING STRUCTURE FOR PORTABLE ELECTRONIC APPARATUS AND LOCKING MECHANISM THEREOF

(75) Inventor: Hung-Chi Chang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 296 days.

(21) Appl. No.: 13/311,563

(22) Filed: Dec. 6, 2011

(65) Prior Publication Data

US 2013/0033157 A1    Feb. 7, 2013

(30) Foreign Application Priority Data

Aug. 5, 2011   (TW) .............................. 100128025 A

(51) Int. Cl.
G06F 1/16    (2006.01)
H01M 2/10    (2006.01)
A47B 81/00   (2006.01)

(52) U.S. Cl.
USPC ................... 361/679.58; 361/679.55; 429/97; 429/100; 312/223.1; 312/223.2

(58) Field of Classification Search
USPC ............. 361/679.01–679.45, 679.55–679.59; 429/97, 100; 312/223.1, 223.2
See application file for complete search history.

(56) References Cited

U.S. PATENT DOCUMENTS

| 5,508,124 | A * | 4/1996 | Gordecki et al. | 429/97 |
|---|---|---|---|---|
| 7,095,607 | B2 * | 8/2006 | Imamura | 361/679.57 |
| 7,531,268 | B2 * | 5/2009 | Huang | 429/97 |
| 7,796,381 | B2 * | 9/2010 | Zuo et al. | 361/679.57 |
| 8,531,823 | B2 * | 9/2013 | Ho | 361/679.01 |
| 2007/0091556 | A1 * | 4/2007 | Wu | 361/683 |
| 2011/0269004 | A1 * | 11/2011 | Chang et al. | 429/97 |

* cited by examiner

*Primary Examiner* — Jayprakash N Gandhi
*Assistant Examiner* — Nidhi Desai
(74) *Attorney, Agent, or Firm* — Winston Hsu; Scott Margo

(57) ABSTRACT

A casing structure and a locking mechanism thereof for portable electronic apparatus are disclosed. The casing structure includes an apparatus casing, an electronic device casing, and a door. The electronic device casing is engaged to the apparatus casing in a detachable way. The door is engaged to the apparatus casing in an open-able way to cover an open of the apparatus casing. The locking mechanism is mainly disposed on the apparatus casing and can be operative to lock or unlock the electronic device casing and the door simultaneously. Thereby, a user can quickly detach the electronic device casing and open the door to maintain or replace components in the apparatus casing, which avoids the complicated operation of opening the casing in the prior art.

19 Claims, 7 Drawing Sheets

CASING STRUCTURE FOR PORTABLE ELECTRONIC APPARATUS AND LOCKING MECHANISM THEREOF

BACKGROUND OF THE INVENTION

1. Field of the Invention

The invention relates to a casing structure for portable electronic apparatus and a locking mechanism thereof, and especially relates to a casing structure for portable electronic apparatus having function of simultaneously locking or unlocking and relates to a locking mechanism thereof.

2. Description of the Prior Art

Portable electronic apparatuses such as notebooks have been used widely in daily lives . The battery thereof is an electronic device frequently detached from the host by a user. In general, there is usually a locking structure on the casing of the notebook for the user to detach and attach the battery. However, for other electronic components such as memories which needn't be detached or attached, there is usually a door fixed by screws on the casing of the notebook for a maintenance person to open for maintaining or change the memories . In a practical case of changing memories, the battery is detached first so as not to damage electronic components due to short or ESD during the following operation. Then, the screws are loosed so as to detach the door. The memories are therefore to be change. It is obvious that the fixing structure for the door is not conducive to opening the door. Moreover, for the whole operation of maintaining and changing memories, opening the casing (including detaching the battery and the door) still seems complicated.

SUMMARY OF THE INVENTION

An objective of the invention is to provide a locking mechanism for a portable electronic apparatus. The locking mechanism is capable of locking or unlocking the casing of the portable electronic apparatus so that a user can open the casing quickly, which solves the complicated opening operation on the casing in the prior art.

The locking mechanism of the invention is disposed in a portable electronic apparatus. The portable electronic apparatus includes an apparatus casing, an electronic-device casing, and a door. The apparatus casing has an opening. The electronic-device casing is engaged with the apparatus casing in a detachable way. The door is engaged with the apparatus casing in an open-able way to cover the opening. The locking mechanism includes a first locking structure, a second locking structure, a manipulation part, a third locking structure, and a fourth locking structure. The first locking structure is disposed on the electronic-device casing. The second locking structure is disposed on the door. The manipulation part is disposed on the apparatus casing. The third locking structure is connected to the manipulation part and capable of being engaged with the first locking structure. The fourth locking structure is connected to the manipulation part and capable of being engaged with the second locking structure. Therein, when the door is engaged with the apparatus casing and covers the opening, and the electronic-device casing is engaged with the apparatus casing, the manipulation part is capable of being manipulated such that the third locking structure and the fourth locking structure are engaged with the first locking structure and the second locking structure respectively and simultaneously so as to lock the door and the electronic-device casing or disengaged from the first locking structure and the second locking structure respectively and simultaneously so as to unlock the door and the electronic-device casing. Therefore, a user can manipulate the manipulation part to unlock quickly to detach or open the electronic-device casing and the door so as to maintain or change the components of the portable electronic apparatus.

Another objective of the invention is to provide a casing structure for a portable electronic apparatus. The casing structure includes the locking mechanism of the invention. The casing structure therefore has the functions of simultaneously locking or unlocking the casing of the portable electronic apparatus, so that a user can open the casing quickly, which solves the complicated opening operation on the casing in the prior art.

The casing structure of the invention includes an apparatus casing, an electronic-device casing, a door, a first locking structure, a second locking structure, a manipulation part, a third locking structure, and a fourth locking structure. The apparatus casing has an accommodating space and an opening connected to the accommodating space. The electronic-device casing is engaged with the apparatus casing in a detachable way. The door is engaged with the apparatus casing in an open-able way to cover the opening. The first locking structure is disposed on the electronic-device casing. The second locking structure is disposed on the door. The manipulation part is disposed on the apparatus casing. The third locking structure is connected to the manipulation part and capable of being engaged with the first locking structure. The fourth locking structure is connected to the manipulation part and capable of being engaged with the second locking structure. Therein, when the door is engaged with the apparatus casing and covers the opening, and the electronic-device casing is engaged with the apparatus casing, the manipulation part is capable of being manipulated such that the third locking structure and the fourth locking structure are engaged with the first locking structure and the second locking structure respectively and simultaneously so as to lock the door and the electronic-device casing or disengaged from the first locking structure and the second locking structure respectively and simultaneously so as to unlock the door and the electronic-device casing. Similarly, a user can manipulate the manipulation part to unlock quickly to detach or open the electronic-device casing and the door so as to maintain or change the components of the portable electronic apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
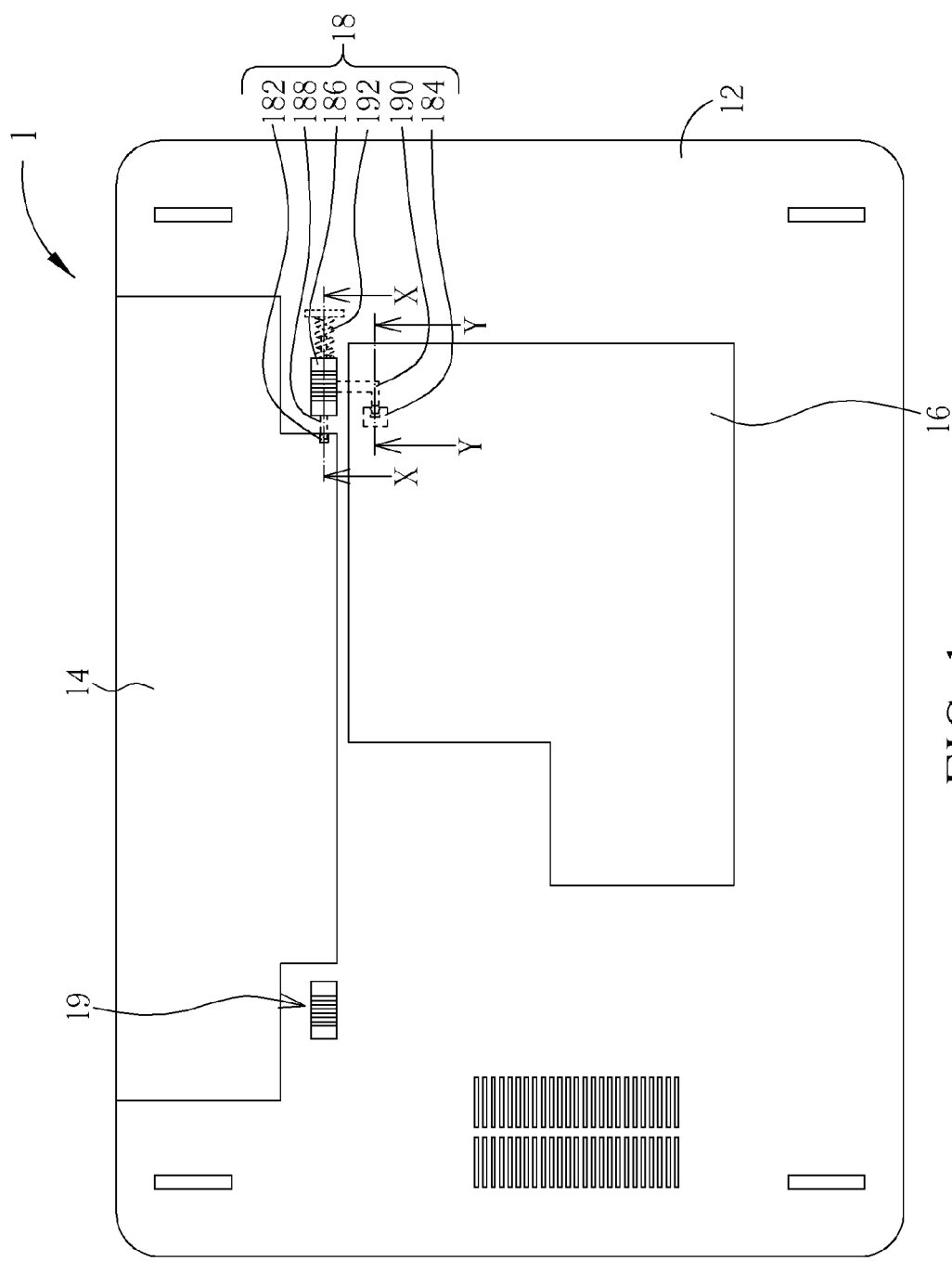
FIG. 1 is a bottom view of a casing structure of a portable electronic apparatus of an embodiment according to the invention.

Please refer to FIG. 1, which is a bottom view of a casing structure 1 of a portable electronic apparatus of an embodiment according to the invention. In the embodiment, the portable electronic apparatus is a notebook; the casing structure 1 is the host casing of the notebook. Bu the invention is not limited to this. In the embodiment, the casing structure 1 includes an apparatus casing 12, an electronic-device casing 14, a door 16, and a locking mechanism 18. Therein, a portion of the locking mechanism 18 shaded by the apparatus casing 12 is shown by dashed lines in the figure.

Figure 2:
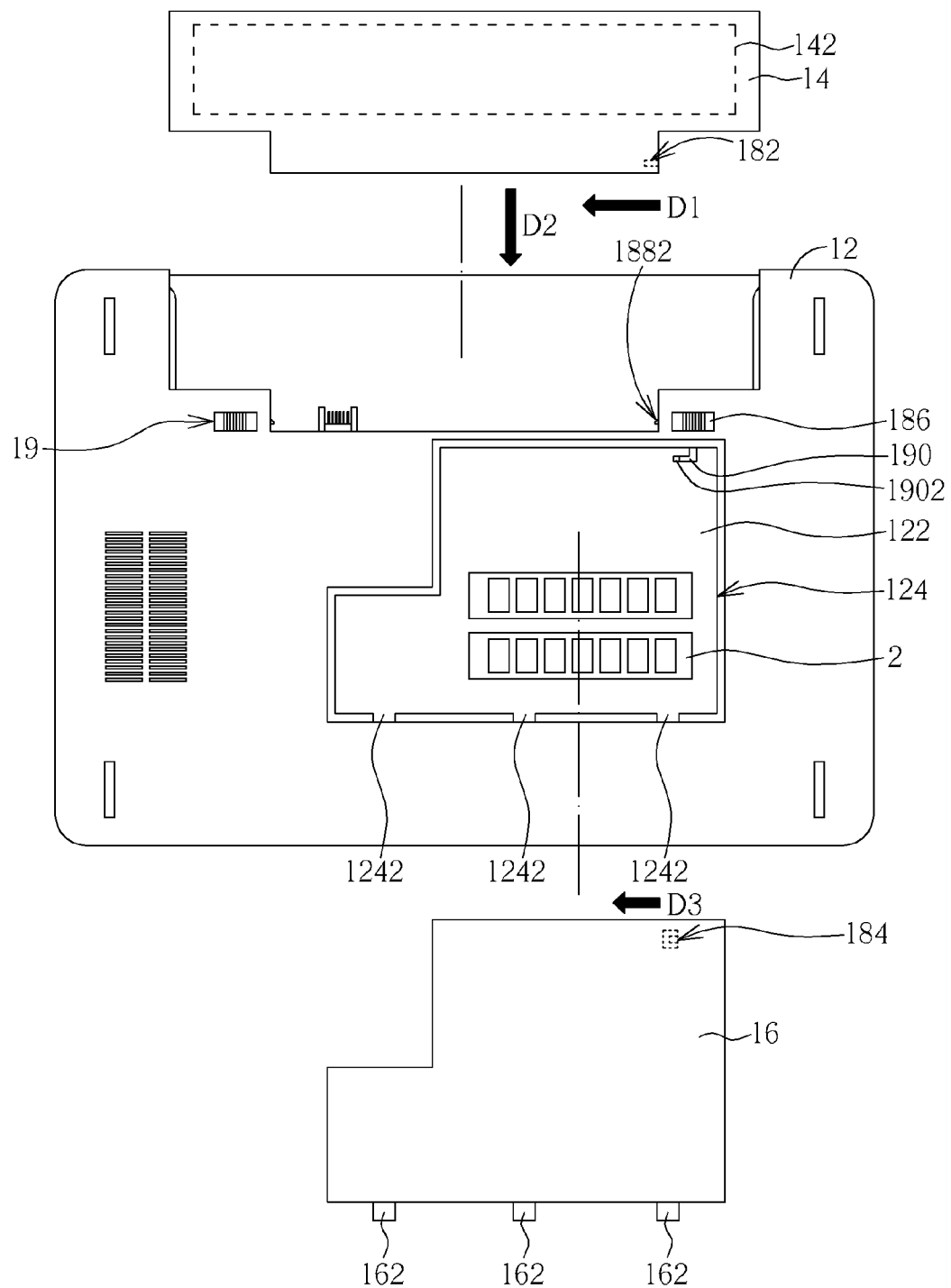
FIG. 2 is a schematic diagram illustrating the casing structure without the electronic-device casing and the door.

Please also refer to FIG. 2, which is a schematic diagram illustrating the casing structure 1 without the electronic-device casing 14 and the door 16. The apparatus casing 12 has an accommodating space 122 and an opening 124 connected to the accommodating space 122. The electronic-device casing 14 is engaged with the apparatus casing 12 in a detachable way. In the embodiment, the electronic-device casing 14 is for a battery module of the notebook. A battery (shown by solid dashed lines) is disposed inside the electronic-device casing 14. In practice, the electronic-device casing 14 can be a removeable device capable of being engaged with the apparatus casing 12. However, the invention is not limited to both. The door 16 is engaged with the apparatus casing 12 in an open-able way to cover the opening 124. When the door 16 is opened, internal electronic device 2 can be seen through the opening 124, such as the memory 2 disposed in the accommodating space 122. In practice, the internal electronic device 2 can be other electronic component, such as a lithium battery, a communication module, an antenna connection cable, even or a CPU, but the invention is not limited to these.

The locking mechanism 18 includes a first locking structure 182, a second locking structure 184, a manipulation part 186, a third locking structure 188, a fourth locking structure 190, and a return spring 192. The first locking structure 182 is disposed on the electronic-device casing 14. The second locking structure 184 is disposed on the door 16. The manipulation part 186 is disposed on the apparatus casing 12 to be capable of moving relative to the apparatus casing 12. The third locking structure 188 is connected to the manipulation part 186 and capable of being engaged with the first locking structure 182. The fourth locking structure 190 is connected to the manipulation part 186 and capable of being engaged with the second locking structure 184. The return spring 192 urges against and between the manipulation part 186 and a rib 126 of the apparatus casing 12 so as to drive the manipulation part 186 back to a locking position.

Figure 3:
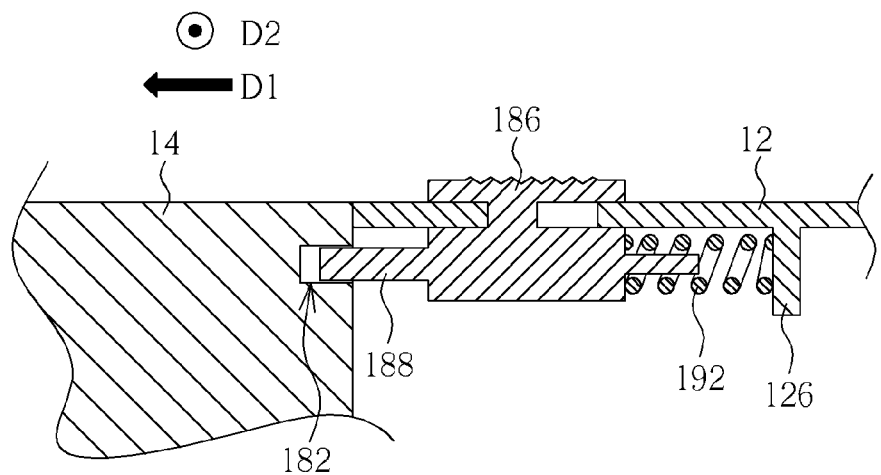
FIG. 3 is a partial sectional view of the casing structure along the line X-X in FIG. 1.
Figure 4:
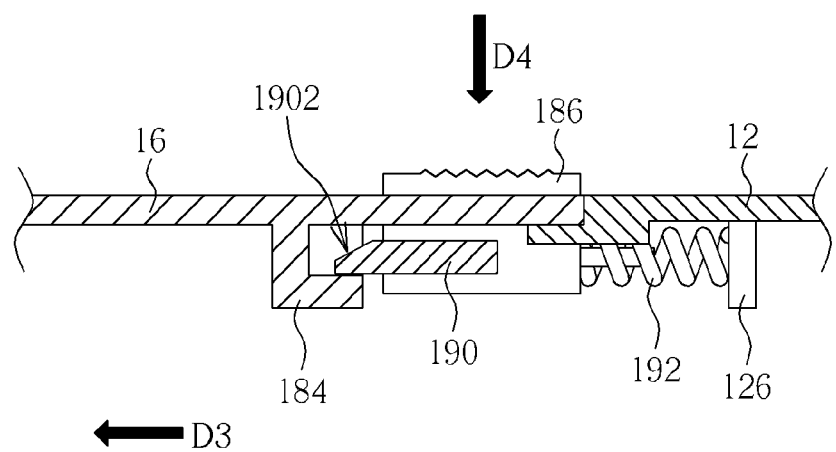
FIG. 4 is a partial sectional view of the casing structure along the line Y-Y in FIG. 1.

Please also refer to FIG. 3 and FIG. 4. FIG. 3 is a partial sectional view of the casing structure 1 along the line X-X in FIG. 1; therein, for a simple drawing, the internal structure (including a battery 142) of the electronic-device casing 14 is not shown in detail. FIG. 4 is a partial sectional view of the casing structure 1 along the line Y-Y in FIG. 1; therein, for a simple drawing, only the disposition relation of the door 16, the locking mechanism 18, and the apparatus casing 12 is shown. In the embodiment, the first locking structure 182 is a first locking slot. The second locking structure 184 is a second locking slot. The third locking structure 188 is a first latch. The fourth locking structure 190 is a second latch. The first latch is capable of being inserted into the first locking slot. The second latch is capable of being inserted into the second locking slot.

In embodiment, the first locking slot extends in a first direction D1. The electronic-device casing 14 is engaged or disengaged with the apparatus casing 12 parallel to a second direction D2. The second direction D2 is perpendicular to the first direction D1. Therefore, after the first latch is inserted into the first locking slot, the electronic-device casing 14 can be prevented efficiently from being disengaged from the apparatus casing 12. It is added that the first latch has an oblique surface 1882 at its front end. When the electronic-device casing 14 is engaged with the apparatus casing 12 along the second direction D2, the electronic-device casing 14 can push the oblique surface 1882 to retract the first latch back. Then, when the electronic-device casing 14 is moved to a locking position, the first latch is to be inserted into the first locking slot by use of the resilience by the return spring 192 so as to finish the engagement between the electronic-device casing 14 and the apparatus casing 12. However, the invention is not limited to the case of the first latch with the oblique surface 1882 at its front end.

Furthermore, the second locking slot extends in a third direction D3. The door 16 is engaged or disengaged with the apparatus casing 12 in a fourth direction D4. The fourth direction D4 is perpendicular to the third direction D3. Therefore, after the second latch is inserted into the second locking slot, the door 16 can be prevented efficiently from being disengaged from the apparatus casing 12. It is added that in a practical engagement of the door 16 with the apparatus casing 12, three tenons 162 of the door 16 are first inserted into three locking slots 1242 of the apparatus casing 12 at the edge of the opening 124, and the door 16 is then rotated till the opening 124 is covered completely. Therefore, in practice, the second locking slot approaches the second latch in a curve path. The movement direction of the second locking slot can be regarded as the direction perpendicular to the third direction D3, when the second locking slot is quite close to the second latch. In the embodiment, for simple illustration, the fourth direction D4 is still taken as the direction of the door 16 being engaged with the apparatus casing 12. In addition, the second latch also has an oblique surface 1902 at its front end. When the door 16 is engaged with the apparatus casing 12 along the fourth direction D4, the second locking structure 184 can push the oblique surface 1902 to retract the second latch back. Then, when the door 16 covers the opening 124 completely, the second latch is to be inserted into the second locking slot by use of the resilience by the return spring 192 so as to finish the engagement between the door 16 and the apparatus casing 12. However, the invention is not limited to the case of the second latch with the oblique surface 1902 at its front end.

It is added that in the embodiment, the third direction D3 is identical to the first direction D1, so the manipulation part 186 can be designed to be moved parallel to the first direction D1 for simple mechanism. Furthermore, in the embodiment, the fourth direction D4 is perpendicular to the second direction D2, which is due to a common design for notebook; that is, the battery module is usually inserted from a side. However, the invention is not limited to it. In addition, there is a gap existing between the second latch and the apparatus casing 12. In practice, the second latch can be disposed closer to the apparatus casing 12 to enhance the engagement strength between the second latch and the second locking slot. It is added more that in practice, the locking mechanism for the battery module is usually disposed symmetrically. In the embodiment, the casing structure 1 also includes another locking mechanism 19 opposite to the locking mechanism 18 for locking the electronic-device casing 14. In practice, if the coverage of the door 16 spreads close to the locking mechanism 19, the locking mechanism 19 can lock the door 16 together with the locking mechanism 18.

As discussed above, based on the characteristics of the locking mechanism of the invention, when the door 16 is engaged with the apparatus casing 12 and covers the opening 124, and the electronic-device casing 14 is engaged with the apparatus casing 12, the manipulation part 186 is capable of being manipulated such that the third locking structure 188 and the fourth locking structure 190 are engaged with the first locking structure 182 and the second locking structure 184 respectively and simultaneously so as to lock the door 16 and the electronic-device casing 14; when the door 16 and the electronic-device casing 14 have been locked by the locking mechanism 18, the manipulation part 186 is capable of being manipulated such that the third locking structure 188 and the fourth locking structure 190 are disengaged from the first locking structure 182 and the second locking structure 184 respectively and simultaneously so as to unlock the door 16 and the electronic-device casing 14. After the unlocking, a user can detach the electronic-device casing 14 and the door 16 and then maintain or change the internal electronic device 2 in the accommodating space 122. In other words, the user can manipulate the manipulation part 186 to unlock the engagement of the two components with the apparatus casing 12 simultaneously, which saves time efficiently and solves the complicated opening operation on the casing in the prior art.

Figure 5:
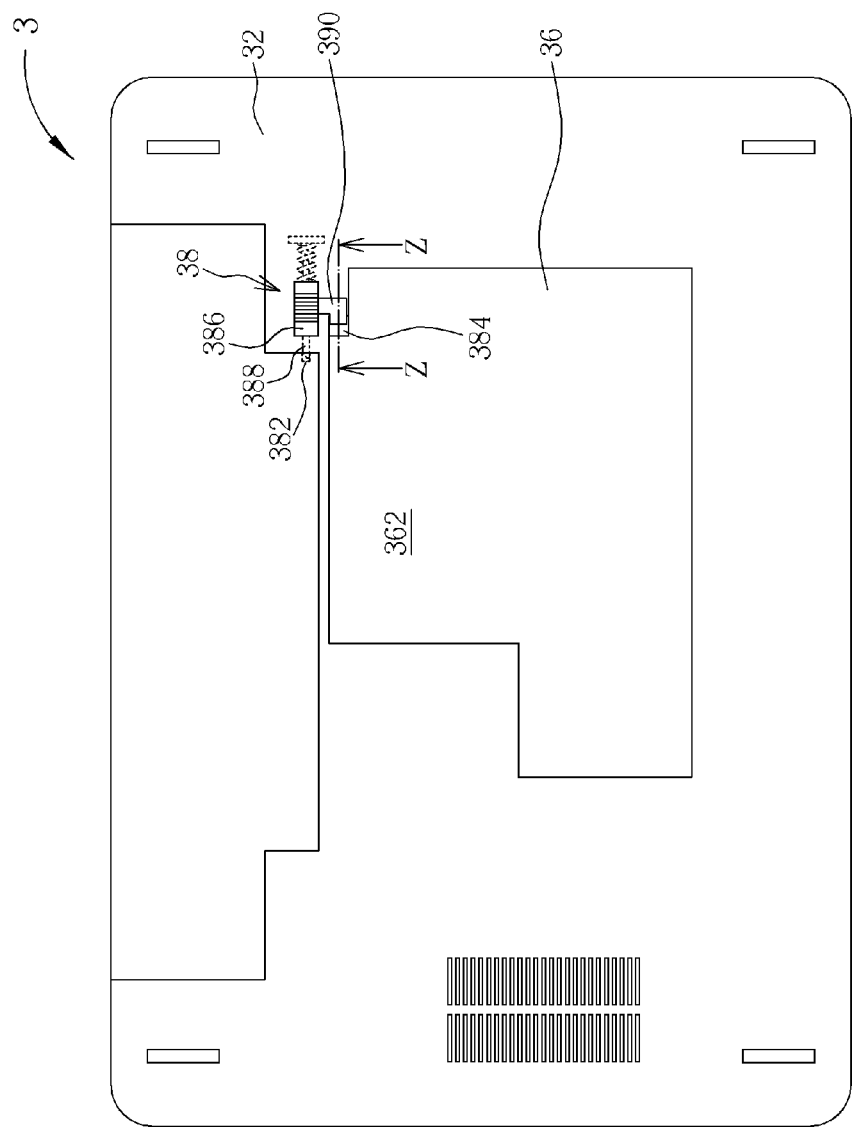
FIG. 5 is a bottom view of a casing structure according to another embodiment.
Figure 6:
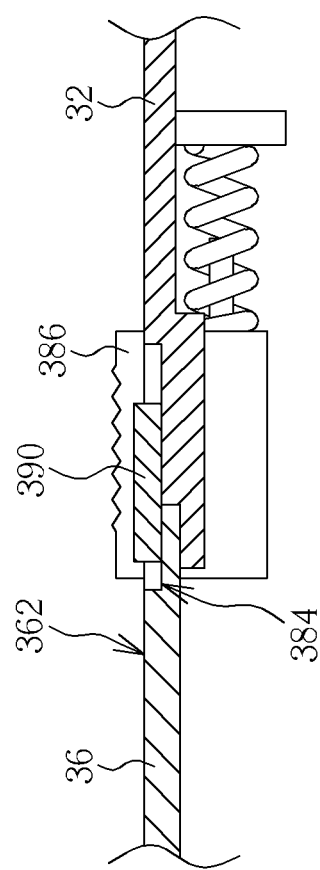
FIG. 6 is a partial sectional view of the casing structure along the line Z-Z in FIG. 5.

In the above embodiment, the second locking slot is a hole, but the invention is not limited to it. Please refer to FIG. 5 and FIG. 6. FIG. 5 is a bottom view of a casing structure 3 according to another embodiment. FIG. 6 is a partial sectional view of the casing structure 3 along the line Z-Z in FIG. 5; for a simple drawing, only the disposition relation of the door 36, the locking mechanism 38, and the apparatus casing 32 is shown. In this embodiment, the casing structure 3 is similar to the casing structure 1 in structure. The main difference is that the door 36 has a surface 362. When the door 36 is engaged with the apparatus casing 32, the surface 362 is exposed. The second locking structure 384 of the locking mechanism 38 is a locking slot formed on the surface 362, i.e. in practice, by forming a step structure on the surface 362. The fourth locking structure 390 is exposed out of the apparatus casing 32 to be capable of moving on the apparatus casing 32. Similarly, when the fourth locking structure 390 is moved into the second locking structure 384, the door 36 can also be prevented from being disengaged from the apparatus casing 32. Therefore, the user can also manipulate the manipulation part 386 such that the fourth locking structure 390 is engaged with or disengaged from the second locking structure 384. It is added that in practice, the first locking structure 382 and the third locking structure 388 of the locking mechanism 38 can also be designed to be engaged with the second locking structure 384 and the fourth locking structure 390, which is no longer described herein.

Figure 7:
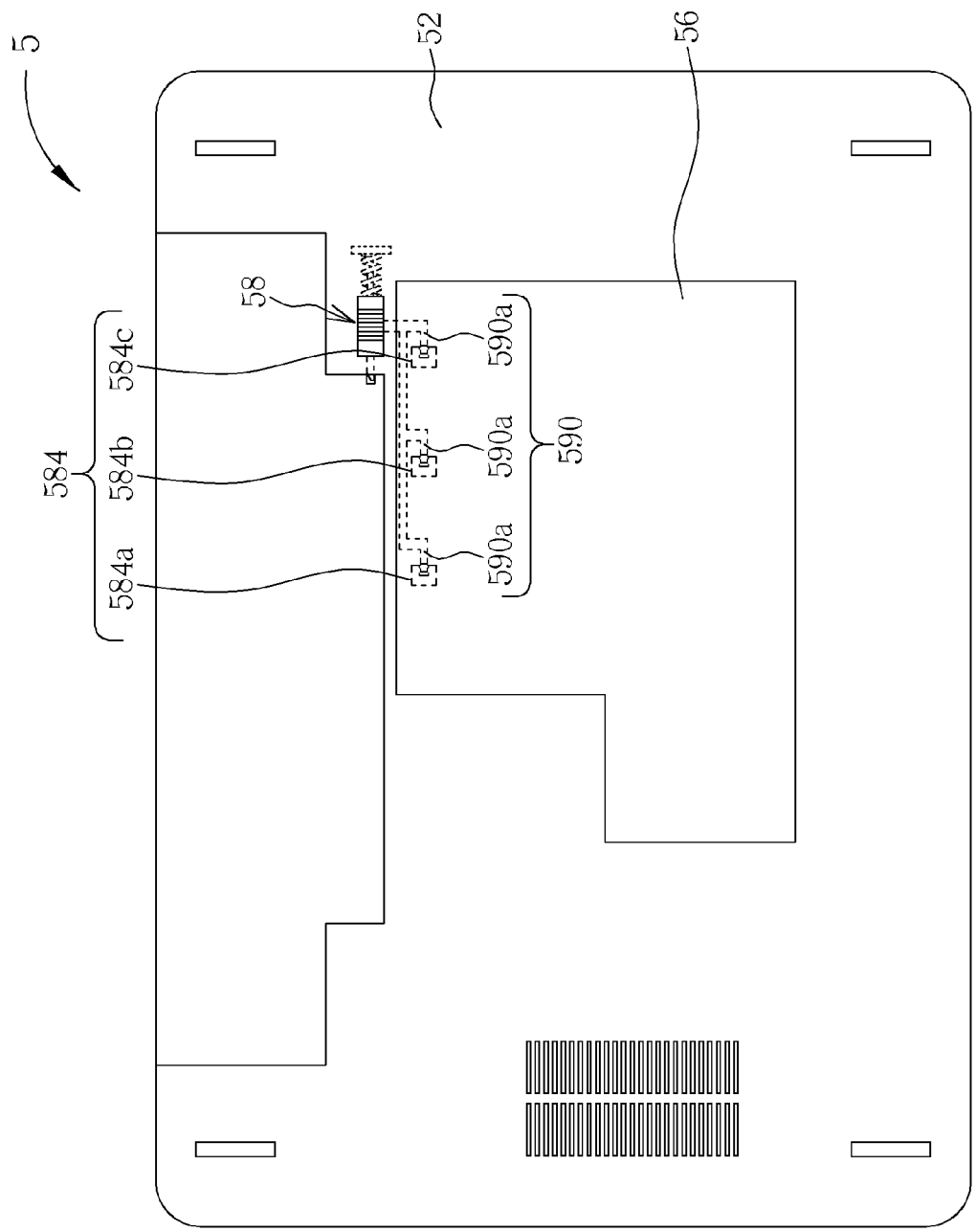
FIG. 7 is a bottom view of a casing structure according to another embodiment.

Please refer to FIG. 7, which is a bottom view of a casing structure 5 according to another embodiment. The casing structure 5 is similar to the casing structure 1 in structural. The main difference is that in the locking mechanism 58, the fourth locking structure 590 has three latches 590a, 590b and 590c. The second locking structure 584 has three locking slots 584a, 584b and 584c correspondingly. Therefore, there are three engagement structures between the second locking structure 584 and the fourth locking structure 590 so as to enhance more the engagement strength between the door 56 and the apparatus casing 52.

Figure 8:
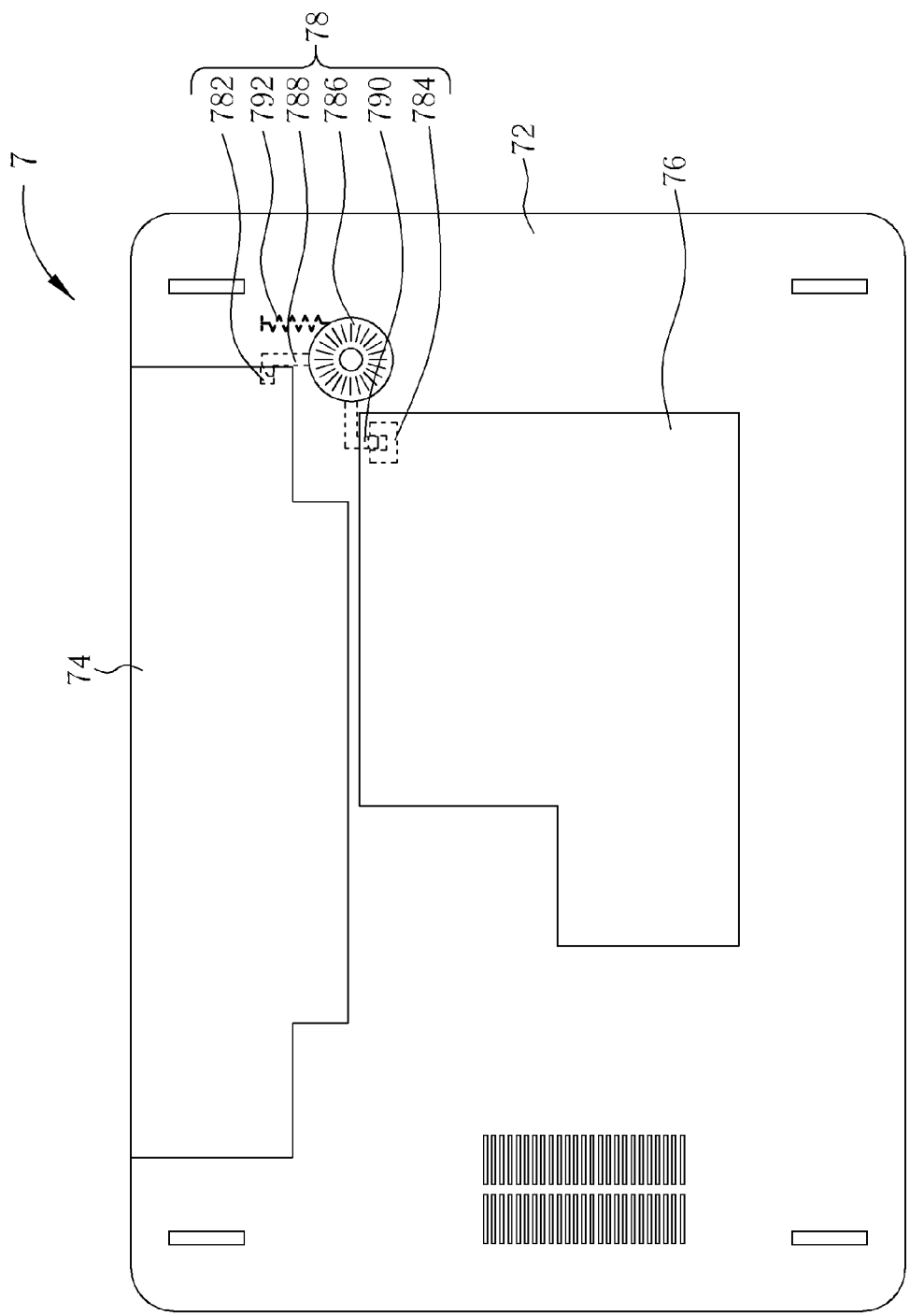
FIG. 8 is a bottom view of a casing structure according to another embodiment.

In the above embodiments, the locking mechanisms perform the locking and unlocking mechanism by linear movement, but the invention is not limited to it. Please refer to FIG. 8, which is a bottom view of a casing structure 7 according to another embodiment. The main difference between the casing structure 7 and the abovementioned casing structure 1 is that a locking mechanism 78 of the casing structure 7 is designed by rotational movement. Further, a third locking structure 788 and a fourth locking structure 790 of the locking mechanism 78 respectively are a L-shaped latch connected to a circular manipulation part 786. The manipulation part 786 is disposed on the apparatus casing 72 in a rotable way. A first locking structure 782 and a second locking structure 784 are still designed to be locking slots for the latches to be inserted into, disposed on the electronic-device casing 74 and the door 76 respectively. Thereby, a user can rotate the manipulation part 786 counterclockwise such that the third locking structure 788 and the fourth locking structure 790 are engaged with the first locking structure 782 and the second locking structure 784 respectively so as to lock the door 76 and the electronic-device casing 74; the user also can rotate the manipulation part 786 clockwise such that the third locking structure 788 and the fourth locking structure 790 are disengaged from the first locking structure 782 and the second locking structure 784 respectively so as to unlock the door 76 and the electronic-device casing 74. It is added that in the embodiment, the locking mechanism 78 also includes a return spring 792 (shown by solid dashed lines in FIG. 8) for producing resilience by tensile deformation, which is different to the return spring 192 of the locking mechanism 18 for producing resilience by compressive deformation. In practice, the return spring is acceptable as long as it can provide resilience; the invention is not limited to produce resilience by tensing or compressing.

As discussed above, the locking mechanism of the invention can lock or unlock two casings (such as a removeable battery module and a bottom door) engaged with the apparatus casing at the same time. Therefore, a user can detach the battery module and the door quickly so as to safely maintain or change the components disposed in the apparatus casing, which solves the problem in the prior art that maintaining internal electronic components needs to perform the complicated opening operation on the casing first. Furthermore, because the locking mechanism of the invention can lock or unlock two casings engaged with the apparatus casing at the same time, the invention is conducive to reducing the quantity of the locking mechanisms disposed in the whole casing structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A locking mechanism for a portable electronic apparatus, the portable electronic apparatus comprising an apparatus casing, an electronic-device casing, and a door, the apparatus casing having an opening, the electronic-device casing being engaged with the apparatus casing in a detachable way, the door being engaged with the apparatus casing in an openable way to cover the opening, the locking mechanism comprising: a first locking structure, disposed on the electronic-device casing; a second locking structure, disposed on the door; a manipulation part, disposed on the apparatus casing; a third locking structure, connected to the manipulation part and capable of being engaged with the first locking structure; and a fourth locking structure, connected to the manipulation part and capable of being engaged with the second locking structure; wherein when the door is engaged with the apparatus casing and covers the opening, and the electronic-device casing is engaged with the apparatus casing, the manipulation part is capable of being manipulated such that the third locking structure and the fourth locking structure are engaged with the first locking structure and the second locking structure respectively and simultaneously so as to lock the door and the electronic-device casing or disengaged from the first locking structure and the second locking structure respectively and simultaneously so as to unlock the door and the electronic-device casing;

wherein the electronic-device casing accommodates a battery.

2. The locking mechanism of claim 1, wherein the first locking structure is a first locking slot, the second locking structure is a second locking slot, the third locking structure is a first latch, the fourth locking structure is a second latch, the first latch is capable of being inserted into the first locking slot, and the second latch is capable of being inserted into the second locking slot.

3. The locking mechanism of claim 2, wherein the first locking slot extends in a first direction, the electronic-device casing is engaged with or disengaged from the apparatus casing parallel to a second direction, and the second direction is perpendicular to the first direction.

4. The locking mechanism of claim 3, wherein the second locking slot extends in a third direction, the door is engaged with or disengaged from the apparatus casing parallel to a fourth direction, and the fourth direction is perpendicular the third direction.

5. The locking mechanism of claim 4, wherein the third direction is identical to the first direction.

6. The locking mechanism of claim 5, wherein the fourth direction is perpendicular to the second direction.

7. The locking mechanism of claim 5, wherein the manipulation part is capable of being manipulated to move on the apparatus casing parallel to the first direction such that the third locking structure and the fourth locking structure are engaged with or disengaged from the first locking structure and the second locking structure respectively.

8. The locking mechanism of claim 4, wherein the door has a surface, and when the door is engaged with the apparatus casing, the surface is exposed, and the second locking slot is formed on the surface.

9. The locking mechanism of claim 2, wherein the manipulation part is capable of being manipulated to rotate relative to the apparatus casing such that the third locking structure and the fourth locking structure are engaged with or disengaged from the first locking structure and the second locking structure respectively.

10. The locking mechanism of claim 2, wherein the first locking slot and the second locking slot respectively are a hole.

11. A casing structure for portable electronic apparatus, comprising: an apparatus casing, having an accommodating space and an opening connected to the accommodating space; an electronic-device casing, engaged with the apparatus casing in a detachable way, the electronic-device casing accommodating a battery; a door, engaged with the apparatus casing in an open-able way to cover the opening; a first locking structure, disposed on the electronic-device casing; a second locking structure, disposed on the door; a manipulation part, disposed on the apparatus casing; a third locking structure, connected to the manipulation part and capable of being engaged with the first locking structure; and a fourth locking structure, connected to the manipulation part and capable of being engaged with the second locking structure; wherein when the door is engaged with the apparatus casing and covers the opening, and the electronic-device casing is engaged with the apparatus casing, the manipulation part is capable of being manipulated such that the third locking structure and the fourth locking structure are engaged with the first locking structure and the second locking structure respectively and simultaneously so as to lock the door and the electronic-device casing or disengaged from the first locking structure and the second locking structure respectively and simultaneously so as to unlock the door and the electronic-device casing.

12. The casing structure of claim 11, wherein the first locking structure is a first locking slot, the second locking structure is a second locking slot, the third locking structure is a first latch, the fourth locking structure is a second latch, the first latch is capable of being inserted into the first locking slot, and the second latch is capable of being inserted into the second locking slot.

13. The casing structure of claim 12, wherein the first locking slot extends in a first direction, the electronic-device casing is engaged with or disengaged from the apparatus casing parallel to a second direction, and the second direction is perpendicular to the first direction.

14. The casing structure of claim 13, wherein the second locking slot extends in a third direction, the door is engaged with or disengaged from the apparatus casing parallel to a fourth direction, and the fourth direction is perpendicular the third direction.

15. The casing structure of claim 14, wherein the third direction is identical to the first direction.

16. The casing structure of claim 15, wherein the fourth direction is perpendicular to the second direction.

17. The casing structure of claim 15, wherein the manipulation part is capable of being manipulated to move on the apparatus casing parallel to the first direction such that the third locking structure and the fourth locking structure are engaged with or disengaged from the first locking structure and the second locking structure respectively.

18. The casing structure of claim 12, wherein the manipulation part is capable of being manipulated to rotate relative to the apparatus casing such that the third locking structure and the fourth locking structure are engaged with or disengaged from the first locking structure and the second locking structure respectively.

19. The casing structure of claim 12, wherein the first locking slot and the second locking slot respectively are a hole.

* * * * *